United States Patent [19]

Maruyama et al.

[11] Patent Number: 4,467,068
[45] Date of Patent: Aug. 21, 1984

[54] COMPOSITION FOR CONCEALING GRAZE MARKS ON GLASS

[75] Inventors: Kazo Maruyama; Akitsugu Kurita, both of Ohta, Japan

[73] Assignee: Toshiba Silicone Co., Ltd., Tokyo, Japan

[21] Appl. No.: 495,860

[22] Filed: May 18, 1983

[51] Int. Cl.³ .............. C08G 77/42; C08L 83/10; B32B 17/10
[52] U.S. Cl. .................. 524/731; 524/838; 524/864; 528/37; 528/38; 428/429
[58] Field of Search .............. 524/731, 838, 864; 528/37, 38; 428/429

[56] References Cited

U.S. PATENT DOCUMENTS

| | | | |
|---|---|---|---|
| 3,259,518 | 7/1966 | Sterman | 528/38 |
| 3,551,376 | 12/1970 | Seyfried | 528/38 |
| 3,702,769 | 11/1972 | Vaughn | 528/38 |
| 3,814,710 | 6/1974 | Duncan | 524/838 |
| 3,868,342 | 2/1975 | Magne | 528/38 |
| 3,890,271 | 6/1975 | Kokoszka | 528/38 |
| 4,252,933 | 2/1981 | Sumida | 528/38 |
| 4,311,737 | 1/1982 | Ishizaka | 528/38 |
| 4,359,545 | 11/1982 | Ona | 524/721 |
| 4,412,035 | 10/1983 | Kurita et al. | 524/838 |

FOREIGN PATENT DOCUMENTS

| | | | |
|---|---|---|---|
| 5025431 | 2/1980 | Japan | 528/38 |
| 5133466 | 10/1980 | Japan | 528/38 |
| 5133467 | 10/1980 | Japan | 528/38 |
| 0167449 | 10/1983 | Japan | |

Primary Examiner—C. Warren Ivy
Attorney, Agent, or Firm—Gary L. Loser

[57] ABSTRACT

A composition for concealing grazes or scratches on glass surfaces comprising an emulsion of composition (A) and composition (B), said composition (A) comprising the emulsion-polymerization product of:
(1) 0.1–60 weight percent of (A) of the reaction product of:
  (a) 0.1–50 weight percent of (a) and (b) of the product obtained by reacting:
    (i) 1 mole of a compound of the formula $Q^1NHR^1SiR_a^2(OR)_{3-a}$ with
    (ii) 0.5–3.0 moles of a compound of the formula $Q^2R^4SiR_a^2(OR)^6{}_{3-b}$;
  (b) 50–99.9 weight percent of (a) and (b) of a polydiorganosiloxane having at least one silanol group and a viscosity at 25° C. of 5–10,000 cSt;
(2) 1–50 weight percent of (A) of a compound of the formula $(R^7R^8SiO)_n$;
(3) 0.1–20 weight percent of (A) of a cationic surfactant or mixture of cationic and nonionic surfactants;
(4) 20–90 weight percent of (A) of water; and
(5) an effective amount of alkali metal hydroxide having catalytic ability; and said composition (B) being obtained by emulsifying in water a polydiorganosiloxane having a viscosity at 25° C. of 10–100,000 cSt in the presence of a cationic or nonionic surfactant or mixture thereof.

17 Claims, No Drawings

COMPOSITION FOR CONCEALING GRAZE MARKS ON GLASS

BACKGROUND OF THE INVENTION

The present invention relates to a composition which conceals grazes or scratches on glass surfaces such as repeatedly reusable glass bottles. More particularly, the present invention relates to a composition which may be characterized as a film formed by coating an emulsion obtained by mixing a composition whose principal ingredient is a polydiorganosiloxane capable of forming an adhesive film on a glass surface at room temperature and a composition whose principal ingredient is a polydiorganosiloxane fluid.

Glass bottles used as containers for beer, soft drinks and milk are usually collected after use and repeatedly reused. On the surface of such glass bottles, grazes are caused by the bottles contacting one another or contacting metals such as in machines utilized in the packing process or distribution. As the appearance of the bottles becomes less attractive by repeated reuse, the value of the packaged goods also apparently becomes lower.

To prevent the degradation of the appearance of the glass bottles several proposals have been made to form a graze-proof film or to form a concealing film for grazes. However, a satisfactory material has not been found because a variety of properties are necessary to form such graze-proof agents or concealing agents. Some properties which must be present simultaneously include:

(1)
 (a) For a graze-proof film: Excellent film stability under grazing conditions.
 (b) For a concealing film: Excellent concealing property for graze.
(2) Good water resistance and no oil film formed on water when the coated bottle is dipped into water.
(3) No change in the appearance of the bottle; no stickiness and no unusual lubricity due to the presence of the coating film.
(4) Easy handling.
(5)
 (a) Perfect removability by a bottle washing process utilizing an alkaline water, or
 (b) resistance to a bottle washing process and no hindrance to the labeling or other process.
(6) Safe for contact with the human body or foods.
(7) No odor.

Japanese patent application No. 56040/1980, Kokai, which corresponds to U.S. Pat. No. 4,273,834, proposed such a concealing agent formed from a polyorganosiloxane resin containing methyl, phenyl and alkoxy groups bonded to silicon atoms. This concealing agent, however, is dissolved at a higher molecular weight stage only by hydrocarbon solvents such as toluene, xylene or gasoline. Therefore, it is not suitable for application to food containers from a hygiene standpoint. When the concealing agent is made to a low molecular weight the polyorganosiloxane can be dissolved in ethanol so the foregoing problem is avoided, but there are still two disadvantages:

(1) expensive ethanol is required as the solvent, and
(2) such as low molecular weight polyorganosiloxane resin results in a film having insufficient film strength and adhesiveness to glass so that the film formed falls off irregularly during the bottle washing process and thus causes a poorer appearance than an uncoated bottle.

An adhesive coating material in which the principal ingredient is polyorganosiloxane having siloxane units containing an amino group-containing organic group bonded to the silicon atom to improve adhesiveness is described by Japanese publication No. 3627/1971, (which corresponds to U.S. Pat. No. 3,574,673) as a metal surface leveling agent. This coating material, however, has several disadvantages for purposes of the present invention:

(1) it is highly flammable and toxic due to the use of solvent;
(2) the film formed falls off irregularly during the bottle washing process; and,
(3) the film becomes yellowish upon storage because of the large number of amino group-containing organic groups which are necessary.

Several latexes and emulsions of polyorganosiloxanes having functionality such as an amino group-containing group, a mercapto group-containing group and/or a trialkoxysilyl group to give an adhesiveness or form a crosslinked structure is proposed as a treatment agent for fibers and the like in Japanese patent application No. 131661/1979, Kokai which corresponds, to U.S. Pat. No. 4,228,054. However, when such a latex or emulsion is used for coating glass bottles, because its main component is a crosslinkable polyorganosiloxane, the film formed from the latex or emulsion falls off irregularly or the surface of the film becomes roughened by the bottle washing process. Additionally, when a tin compound is used as a catalyst, there is the disadvantage of toxicity.

The present inventors made investigations to discover a concealing agent for grazes or scratches on glass bottles and found that by using a composition obtained by making an emulsion from a composition whose principal ingredient is a polysiloxane capable of forming an adhesive film on glass surfaces at room temperature and a composition whose principal ingredient is a polyorganosiloxane fluid, a film can be formed which is totally removable by the bottle washing process. The present invention has been completed on the basis of these findings.

SUMMARY OF THE INVENTION

According to the present invention there is provided a concealing agent for grazes or scratches on glass surfaces which is characterizable as an emulsion formed from about 10 to about 50 parts by weight of a composition (A) which has as its principal ingredient a film-forming polyorganosiloxane and from about 50 to about 90 parts by weight of a composition (B) which has as its principal ingredient a liquid polydiorganosiloxane. Composition (A) is a silicon emulsion obtained by emulsion-polymerizing:

(1) 0.1–60 weight percent based on composition (A) of the reaction product of:
 (a) 0.1–50 weight percent based on the total of (a) and (b) of the product obtained by reacting:
  (i) 1 mole of a compound of the formula $Q^1NHR^1SiR_a^2(OR^3)_{3-a}$ wherein $Q^1$ is a monovalent radical selected from the group consisting of hydrogen, —CH$_3$, —CH$_2$CH$_2$NH$_2$,  and —CH$_2$CH$_2$NHCH$_2$CH$_2$NH$_2$; R$^1$ is a divalent hydrocarbon group having 3–4 carbon atoms;

$R^2$ and $R^3$ are monovalent hydrocarbon radicals having 1-4 carbon atoms and a represents an integer equal to 0 or 1; with (ii) 0.5-3.0 moles of a compound of the formula:

$$Q^2R^4SiR_b^5(OR^6)_{3-b} \quad (5)$$

wherein $Q^2$ represents an epoxy group-containing group selected from the group consisting of glycidoxy and epoxycyclohexyl groups, $R^4$ is a divalent hydrocarbon group having 2-4 carbon atoms; $R^5$ and $R^6$ are monovalent hydrocarbon groups having 1-4 carbon atoms and b is an integer equal to 0 or 1; with (b) 50-99.9 weight percent based on the total of (a) and (b) of a polydiorganosiloxane having at least one silanol group in the molecule and a viscosity at 25° C. of 5-10,000 cSt;

(2) 1-50 weight percent based on composition (A) of a compound of the formula:

$$[R^7R^8SiO]_n$$

wherein $R^7$ and $R^8$ are the same or different substituted or unsubstituted hydrocarbon radicals having 1-50 carbon atoms and n is an integer equal to 3-6 inclusive;

(3) 0.1-20 weight percent based on composition (A) of a cationic surfactant or a surfactant mixture in which a part of the cationic surfactant is replaced with a nonionic surfactant;

(4) 20-90 weight percent based on composition (A) of water; and (5) an effective amount of an alkali metal hydroxide having catalytic ability.

Composition (B) is obtained by emulsifying in water a polydiorganosiloxane having a viscosity at 25° C. of 10-100,000 cSt in the presence of a surfactant selected from the group consisting of nonionic surfactants, cationic surfactants and mixtures thereof.

DESCRIPTION OF THE INVENTION

The present invention relates to a composition for concealing grazes or scratches on glass surfaces and is characterized as an emulsion composition formed from a composition (A) which has as its principal ingredient a film-forming polyorganosiloxane and a composition (B) which has as its principal ingredient a liquid polydiorganosiloxane.

Composition (A) is obtained by emulsion-polymerizing:

(1) 0.1-60 weight percent based on composition (A) of the reaction product of:

(a) 0.1-50 weight percent based on the total of (a) and (b) of the product obtained by reacting:

(i) 1 mole of a compound of the formula:

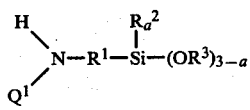
(1)

wherein $Q^1$ is a monovalent radical selected from the group consisting of hydrogen, —$CH_3$, —$CH_2CH_2NH_2$, and —$CH_2CH_2NHCH_2CH_2NH_2$; $R^1$ is a divalent hydrocarbon group having 3-4 carbon atoms; $R^2$ and $R^3$ are monovalent hydrocarbon radicals having 1-4 carbon atoms and a is an integer equal to 0 or 1; with (ii) 0.5-3.0 moles of a compound of the formula:

(2)

wherein $Q^2$ represents an epoxy group-containing group selected from the group consisting of glycidoxy and epoxycyclohexyl groups, $R^4$ is a divalent hydrocarbon radical having 2-4 carbon atoms; $R^5$ and $R^6$ are monovalent hydrocarbon radicals having 1-4 carbon atoms and b is an integer equal to 0 or 1; with (b) 50-99.9 weight percent based on the total of (a) and (b) of a polydiorganosiloxane having at least one silanol group in the molecule and a viscosity at 25° C. of 5-10,000 cSt;

(2) 1-50 weight percent based on composition (A) of a compound of the formula:

$$[R^7R^8SiO]_n \quad (3)$$

wherein $R^7$ and $R^8$ are the same or different substituted or unsubstituted hydrocarbon radicals having 1-50 carbon atoms and n is an integer equal to 3-6 inclusive;

(3) 0.1-20 weight percent based on composition (A) of a cationic surfactant or a surfactant mixture in which part of the cationic surfactant is replaced with a nonionic surfactant;

(4) 20-90 weight percent based on composition (A) of water; and (5) an effective amount of an alkali metal hydroxide having catalytic ability.

Composition (B) is obtained by emulsifying in water a polydiorganosiloxane having a viscosity at 25° C. of 10-100,000 cSt in the presence of a surfactant selected from the group consisting of nonionic surfactants, cationic surfactants and mixtures thereof.

Component (i) of the present invention is an amino group-containing silicon compound described by the general formula

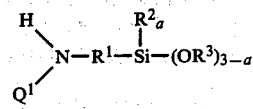

wherein $Q^1$, $R^1$, $R^2$, $R^3$ and a are as defined hereinabove. Within the scope of $R^1$ there may be mentioned, for example, propylene and butylene groups and for $R^2$ and $R^3$ there may be mentioned, for example, methyl, ethyl, n-propyl, isopropyl and n-butyl groups. To obtain the maximum degree of crosslinking, it is preferable that a equal zero. As the amino group-containing silane there may be mentioned, for example, gamma-aminopropyltriethoxysilane, gamma-aminopropylmethyldiethoxysilane, N-(beta-aminoethyl)aminoethyltrimethoxysilane, gamma-[N-(beta-aminoethyl)amino]propyltrimethoxysilane, gamma[N-beta-aminoethyl)amino]propylmethyldimethoxysilane, N-(beta-aminoethyl)aminomethyltributoxysilane or gamma[N-(beta-(N-beta-aminoethyl)amino)ethyl)amino]propyltrimethoxysilane.

Component (ii) of the present invention is an epoxy group-containing silicon compound described by the general formula $Q^2R^4SiR_b^5(OR^6)_{3-b}$, wherein $Q^2$, $R^4$, $R^5$, $R^6$ and b are as defined hereinabove. Within the scope of $R^1$ there may be mentioned, for example, ethylene, propylene and butylene groups and, for $R^5$ and $R^6$ there can be mentioned, for example, methyl, ethyl, n-propyl, isopropyl and n-butyl groups. To maximize the degree of crosslinking it is preferable that b equal zero. As examples of the epoxy group-containing silanes there can be mentioned gamma-glycidoxypropyltrimethoxysilane, gamma-glycidoxypropylmethyldimethoxysilane, beta-(3,4-epoxycyclohexyl)ethyltrimethoxysilane, beta-(3,4-epoxycyclohexyl)ethylmethyldimethoxysilane, beta-(3,4-epoxycyclohexyl)ethyltriethoxysilane, and beta-(3,4-epoxycyclohexyl)ethylmethyldiethoxysilane.

Component (a) of composition (A) is prepared by reacting 1 mole of component (i) with 0.5–3.0 moles, preferably 0.75–1.5 moles of component (ii). The reaction is generally carried out by mixing components (i) and (ii) and heating the mixture to 20°–80° C. while stirring. The reaction product of components (i) and (ii) may contain a small amount of unreacted components. If component (ii) is used in an amount less than 0.5 mole or more than 3.0 moles per mole of component (i), the amount of one of the silane compounds to be reacted becomes insufficient. Thus the reaction mixture formed by the reaction of (i) and (ii) would contain a reduced amount of reaction product having a high functional group content. Accordingly, the desired crosslinked structure could not be obtained and hence sufficient curability and adhesiveness could not be obtained. Particularly, when (ii) is used in an amount of less than 0.5 mole, a lot of unreacted amino groups remain which causes yellowing and changes in the properties of the cured film on standing. The reaction ordinarily proceeds by mixing (i) and (ii) and stirring them at a temperature in the range of 20°–120° C.

As the organo groups bonded to silicon atoms of the silanol group-containing polydiorganosiloxane (b), there may be mentioned, for example, alkyl groups such as methyl, ethyl, propyl, butyl, hexyl, octyl, decyl and dodecyl; aralkyl groups such as beta-phenylethyl and beta-phenylpropyl, the phenyl group and the vinyl group. For easy synthesis, the methyl group or a combination of methyl and phenyl groups is preferred, however, the methyl group is most preferable. Polydiorganosiloxane (b) is a substantially straight-chain molecule wherein one or both ends are blocked by silanol groups. For easy synthesis and good film-forming ability, it is preferable that both ends are blocked by silanol groups. As examples of such polydiorganosiloxanes there may be mentioned alpha, omega-dihydroxy polydimethylsiloxane; alpha-hydroxy omega-trimethylsiloxy polydimethylsiloxane; and alpha, omega-dihydroxy polymethylphenylsiloxane. The viscosity of these polydiorganosiloxanes at 25° C. is from 10–10,000 cSt, and preferably from 20–1000 cSt. If the viscosity of (b) is less than 10 cSt, such polydiorganosiloxane cannot be synthesized stably and the reaction product with (a) will also be unstable. On the other hand, if the viscosity of (b) exceeds 1000 cSt the reaction product with (a) is too viscous to emulsify easily, and if the viscosity exceeds 10,000 cSt, the viscosity of the reaction product is such that large amounts of (2) are necessary to lower the viscosity of the composition. This reduces the amount of (a) present, and moreover, the number of silanol groups contained in (a) is reduced, and consequently, a good film is not obtained.

Reaction product (1) is obtained by reacting components (a) and (b). The amount of the components required to form reaction product (1) is 0.1–50 weight percent of (a) and 50–99.9 weight percent of (b) based on the total amount of (a) and (b). If the amount of (a) is less than 0.1 weight percent, no adhesive film is formed, and if it exceeds 50 weight percent the stability of (1) is so poor that sometimes gelation occurs in the reaction process. The reaction is effected, for example, by stirring (a) and (b) in a nitrogen atmosphere at a temperature of 40°–80° C. for several hours.

The amount of thus obtained component (1) to film-forming composition (A) is 0.1–60 weight percent, preferably 1–30 weight percent. If the amount of component (1) is less than 0.1 weight percent, film which has excellent adhesion properties will not form. If the amount of component (1) exceeds 60 weight percent, the composition cannot be easily emulsified.

Component (2), another starting material of the composition of the present invention, is a cyclic organosiloxane of the formula $[R^7R^8SiO]_n$, wherein $R^7$, $R^8$ and n are as previously defined. In order to obtain easy synthesis and handling it is preferable that $R^7$ and $R^8$ both be methyl groups and that n equal 4 or 5. As examples of such cyclic organosiloxanes there may be mentioned hexamethylcyclotrisiloxane, octamethylcyclotetrasiloxane, decamethylcyclopentasiloxane, dodecamethylcyclohexasiloxane, 1,1-diethylhexamethylcyclotetrasiloxane, hexaethylcyclotrisiloxane, phenylheptamethylcyclotetrasiloxane, 1,1-diphenylhexamethylcyclotetrasiloxane. Such compositions can be used individually or as mixtures.

The amount of component (2) present in composition (A) is in the range 1–50 weight percent, preferably 5–30 weight percent. If the amount of component (2) is less than 1 weight percent or more than 50 weight percent, the composition cannot be easily emulsified and the emulsion after polymerization is not stable. From the viewpoint of stability, the total amount of component (1) and (2) is preferably 20–60 weight percent of the total composition (A).

Component (3) of the present invention is a cationic surfactant or a mixture of a cationic surfactant and a nonionic surfactant. Because an alkali metal hydroxide is used as a polymerization catalyst an anionic surfactant cannot be used. By using only a nonionic surfactant emulsion polymerization would not proceed. As suitable cationic surfactants there may be mentioned, for example, an alkyltrimethylammonium salt such as octadecyltrimethylammonium chloride, hexadecyltrimethylammonium chloride, or didodecyldimethylammonium chloride and a benzalkonium chloride such as octadecyldimethylbenzylammonium chloride, or hexadecyldimethylbenzylammonium chloride. A nonionic surfactant such as glycerol fatty acid ester, sorbitan fatty acid ester, or polyoxyethylene alkylphenol ether may be used jointly with the cationic surfactant to reduce the smell of the quaternary ammonium salt surfactant. Such a nonionic surfactant may be used with a cationic surfactant at emulsion polymerization or may be added as a stabilizer after polymerization.

The amount of component (3) in composition (A) is 0.1–20 weight percent, preferably 0.5–8 weight percent based on (A). If the amount of component (3) is out of this range a good emulsified state cannot be obtained.

The amount of component (4), water, in composition (A) is 20-90 weight percent, and preferably is 40-80 weight percent. If the amount is out of this range, a stable emulsion cannot be formed.

Component (5) of the present invention is an alkali metal hydroxide having the catalytic ability to polymerize siloxanes. There may be mentioned as suitable alkali metal hydroxides, for example, sodium hydroxide, potassium hydroxide, rubidium hydroxide, and cesium hydroxide. Because of its catalytic ability and availability potassium hydroxide is preferable. It is preferred that the amount of (5) to the total of (1) and (2) contained in (A) be 0.1-3 weight percent. If it is less than this range the polymerization rate is too slow and if it exceeds this range the state of the emulsion in the emulsion polymerization is poor. Moreover, the amount of acid material necessary to neutralize the catalyst produces sufficient salt to adversely affect the stability of the obtained emulsion.

Composition (A) of the present invention is obtained by mixing components (1), (2), (3), (4) and (5) together to obtain a rough dispersion, emulsifying such mixture by means of an emulsifying machine such as a colloid mill or a homogenizer to obtain a homogeneous emulsion, and subjecting the emulsion to emulsion polymerization under heating with stirring at a temperature in the range of 30°-90° C., preferably 60°-80° C. After emulsion polymerization, a neutralizer such as hydrochloric acid is added to neutralize (5). Subsequently, as needed, a nonionic surfactant is added, and the composition is homogeneously mixed to form composition (A).

Composition (B) of the present invention is an emulsion obtained by emulsifying a polydiorganosiloxane having a viscosity of 10-100,000 cSt, preferably 100-10,000 cSt, at 25° C. The content of the polydiorganosiloxane is not especially limited, however, in order to obtain the most stable emulsions it is preferably 15-60 weight percent. If the viscosity is less than 10 cSt needed smoothness is not obtained and, moreover, the polydiorganosiloxane would be volatile and have a tendency to bleed out after being coated on a bottle surface. As the viscosity increases, emulsification becomes more difficult, and if the viscosity exceeds 10,000 cSt emulsification is very difficult. Among the organo groups bonded to the silicon atoms there may be mentioned, for example, the same groups as above-mentioned for silanol-containing polydiorganosiloxane (b). For ease of synthesis methyl groups or a combination of methyl and phenyl groups is preferred. Chain ends are preferably terminated by triorganosiloxy groups such as trimethylsiloxy or dimethylphenylsiloxy groups. However, a silicon-functional group such as silanol or ethoxy may exist.

A surfactant for effecting emulsification is selected from nonionic and cationic surfactants. Contrary to ingredient (3), nonionic surfactants may be used without cationic surfactants. In fact, nonionic surfactants are better to use than cationic surfactants with respect to smell and stability of the emulsion. Among the nonionic surfactants there may be mentioned, for example, glycerol fatty acid ester, sorbitan fatty acid ester, polyoxyethylene glycerol fatty acid ester, polyoxyethylene sorbitan fatty acid ester, polyoxyethylene fatty acid ester, polyoxyethylene fatty alcohol ether, polyoxyethylene alkylphenol ether and tetraorganoammonium salt. The amount of the surfactant is not especially limited, but it is preferably 0.5-8 weight percent of (B). Composition (B) is prepared by emulsifying the polydiorganosiloxane in water in the presence of a surfactant by the usual methods.

The emulsion composition used in the present invention for coating a glass surface, particularly a glass bottle, is obtained by mixing composition (A) of which the main ingredient is a polyorganosiloxane which forms an adhesive film at room temperature, and composition (B) which has as its main ingredient a polydiorganosiloxane fluid. It is preferable that the amount of film-forming polysiloxane in (A) range from 1-99 weight percent, and the polydiorganosiloxane fluid in (B) range from 1-99 weight percent based on the total amount of polyorganosiloxane present. It is more preferable that the former be 5-30 weight percent and the latter be 70-95 weight percent. If the amount of the film-forming polyorganosiloxane is too low an adhesive film will not be formed upon coating the emulsion composition on the surface of the glass bottle. If the amount of film-forming polyorganosiloxane is too high the formed film cannot be washed out in a bottle washing process. It is permissible to add a pigment, a stabilizer or the like.

By coating the thus obtained emulsion composition of the present invention directly, or after diluting 30-fold or preferably 10-fold, on a grazed or scratched glass surface and evaporating the contained water, a silicone film is formed on the glass surface. With respect to the method for applying the coating, brush-coating, spraying, puff-coating, dip-coating and the like may be used. In this silicone film the polyorganosiloxane contained in composition (A) forms an adhesive film having a crosslinked structure, and the presence of the polydiorganosiloxane contained in composition (B) gives a smoothness to the film. The thickness of the film may be 0.5-10 microns, preferable 1-3 microns, to obtain a graze-concealing effect, a proper degree of strength, and easy washability in the bottle washing process. If necessary it is sufficient to form a film of the concealing agent of the present invention to the above-mentioned thickness, at least on the grazed portion, and, in this case, the method for forming the film is not limited, but normally brushing or spraying is convenient.

One advantage of the present invention is that no organic solvent is used and thus there are no considerations respecting flammability in the coating process or sanitary problems due to residual solvent.

Furthermore, an additional advantage of this invention is that by not using (i) solely but only after reaction with (ii), the amount of the crosslinkable alkoxy groups per amino group increases, so that in comparison to the case of where (i) is used solely, higher film-forming ability and improved adhesiveness are obtained while employing a smaller amount of amino group. Additionally, most or all of the amino groups are reacted with epoxy groups so that no yellowing or change of properties occurs upon standing as a result of unreacted amino groups.

Another advantage is that by using film-forming polyorganosiloxane, the resulting film does not fall off in the usual conditions of bottling or use, an oily film does not form on the surface of water when the coated bottle is dipped therein, and also by including the polydiorganosiloxane fluid, the film has an improved ability to conceal grazes or scratches, yet it is still easily removable during the bottle washing process.

The present invention thus offers a concealing agent that contains no organic solvents nor organotin compounds and which forms a concealing film for grazes safely and easily on the surface of a glass bottle. The film obtained by the present invention has excellent graze-concealing ability, is water resistant, adheres to glass bottles, and is tough under the usual conditions of bottling, transporting and storing. Its surface has no stickiness or unusual lubricity. It is colorless and does not change color upon extended storage. Moreover, it is easily removable in a bottle washing process with alkaline water so that its appearance is not harmed by a partial falling out.

The following examples will further illustrate the present invention. In these examples, parts means parts by weight.

REFERENTIAL EXAMPLE 1

22.1 parts of gamma-aminopropyltriethoxysilane and 23.6 parts of gamma-glycidoxypropyltrimethoxysilane was mixed, and stirred under heating at 85° C. for 3 hours. A reaction product named S-1 was synthesized stoichiometrically. S-1 was colorless transparent liquid.

REFERENTIAL EXAMPLE 2

From amino group-containing silanes and epoxy group-containing silanes illustrated in Table 1, by the same reaction as Referential Example 1, equimolar reaction products named from S-2 to S-6 were obtained.

TABLE 1

| Experimental No. | 1 | 2 | 3 | 4 | 5 |
|---|---|---|---|---|---|
| Amino group-containing silane (Parts) | | | | | |
| γ-aminopropyltriethoxysilane | 22.1 | | | | 22.1 |
| N—(β-aminoethyl)-γ-aminopropyltrimethoxysilane | | 22.2 | | 22.2 | |
| N—(β-aminoethyl)-γ-aminopropylmethyldimethoxysilane | | | 20.6 | | |
| Epoxy group-containing silane (Parts) | | | | | |
| γ-gylcidoxypropyltrimethoxysilane | | 11.8 | | | |
| γ-glycidoxypropylmethyldimethoxysilane | 22.0 | 11.0 | | | |
| β-(3,4-epoxycyclohexyl)ethyltrimethoxysilane | | | 24.1 | 24.1 | |
| β-(3,4-epoxycyclohexyl)ethyltriethoxysilane | | | | | 28.3 |
| Reaction Product | S-2 | S-3 | S-4 | S-5 | S-6 |

EXAMPLE 1

To 85 parts of alpha, omega-dihydroxypolydimethylsiloxane having a viscosity of 1,000 cSt at 25° C., 15 parts of reaction product S-1 synthesized in Referential Example 1 was added. Then the mixture was stirred under heating at 80° C. for 3 hours, and a base fluid named F-1 was obtained. 10 parts of this base fluid was mixed with 25 parts of cyclic polydimethylsiloxane mixture containing 8 weight percent of hexamethylcyclotrisiloxane, 79 weight percent of octamethylcyclotetrasiloxane and 13 weight percent of decamethylcyclopetasiloxane, 3 parts of dihexadecyldimethylammonium chloride and 61.5 parts of water; 0.5 parts of potassium hydroxide was added and the mixture stirred to obtain a roughly emulsified mixture. The mixture was then passed through a colloid mill of which the mill gap had been adjusted to 10 mil to emulsify, stirred obtained emulsion under heating at 75° C. for 3 hours, cooled to 40° C., and neutralized by adding an aqueous solution of acetic acid, thus producing an A-1 emulsion.

Additionally, 30 parts of polydimethylsiloxane having a viscosity of 500 cSt at 25° C. was mixed with 2 parts of sorbitanmonolaurate, 2 parts of polyoxyethylene (20) sorbitan monooleate and 66 parts of water, and passed through a colloid mill of which mill gap had been adjusted to 10 mil, thus producing a B-1 emulsion.

20 parts of emulsion A-1 and 80 parts of emulsion B-1 were mixed and stirred to obtain emulsion composition E-1.

E-1 was diluted with water 10-fold to prepare a treating agent. Beer bottles whose surfaces have been grazed were settled in a vessel. The treating agent from E-1 was filled into the vessel outside of the bottles up to over 20 mm of shoulders of the bottles to dip the bottle surfaces. The bottles were picked up after 3 minutes and dried 12 hours at the room temperature to form a silicone film on the outside surfaces of the bottles. With this silicone film the graze was perfectly concealed, and the beer bottles seemed to be the same as new ones. The formed film has no stickness nor unusual lubricity.

The treated bottles were washed by 2 percent aqueous solution of caustic soda at 50° C. Silicone film fell perfectly down and the original grazed bottle surfaces appeared.

EXAMPLE 2

By combining as illustrated in Table 2, base fluids F-2 to F-6 were synthesized. Moreover, using these base fluids emulsion-polymerized with other substances illustrated in Table 3 produced emulsions A-2 to A-6. In the same manner emulsions B-2 to B-6 were produced. These were mixed as illustrated in Table 3 to prepare emulsion compositions E-2 to E-6.

TABLE 2

| Experimental No. | | 1 | 2 | 3 | 4 | 5 |
|---|---|---|---|---|---|---|
| α,ω-dihydroxypolydimethylsiloxane (Parts) | | | | | | |
| viscosity at 25° C.; | 40 cSt | 85 | | | | 80 |
| | 100 cSt | | 85 | | | |
| | 1,000 cSt | | | 90 | | |
| α,ω-dihydroxypolydiorganosiloxane (Parts) | | | | | | |
| diphenylsiloxy unit 80 mole % | | | | | | |
| dimethylsiloxy unit 70 mole % | | | | | 80 | |
| viscosity at 25° C.; 1,000 cSt | | | | | | |
| Reaction Product (Parts) | | | | | | |
| S-2 | | 15 | | | | |
| S-3 | | | 15 | | | |
| S-4 | | | | 10 | | |
| S-5 | | | | | 20 | |
| S-6 | | | | | | 20 |

TABLE 2-continued

| Experimental No. | 1 | 2 | 3 | 4 | 5 |
|---|---|---|---|---|---|
| Base fluid | F-2 | F-3 | F-4 | F-5 | F-6 |

TABLE 3

| Experimental No. | 1 | 2 | 3 | 4 | 5A | 5B |
|---|---|---|---|---|---|---|
| Emulsion polymerization | | | | | | |
| Base fluid (Parts) | | | | | | |
| F-2 | 10 | | | | | |
| F-3 | | 10 | | | | |
| F-4 | | | 15 | | | |
| F-5 | | | | 10 | | |
| F-6 | | | | | 15 | 15 |
| Octamethylcyclotetrasiloxane (Parts) | 25 | 25 | 20 | 20 | 25 | 25 |
| Surfactant (Parts) | | | | | | |
| Dihexadecyldimethylammonium chloride | 3 | | | | | |
| Dioctadecyldimethylammonium chloride | | 2 | | | | |
| Octadecyltrimethylammonium chloride | | | 3 | 2 | 3 | 3 |
| Hexadecyldimethylbenzyl-ammonium chloride | | 1 | | 1 | | |
| Polyoxyethylene (20) sorbitan stearate | | | 2 | | | |
| Polyoxyethylene (40) stearate | | | | 2 | | |
| Water (Parts) | 61.5 | 61.5 | 59.2 | 64.5 | 55.5 | 55.5 |
| Potassium Hydroxide (Parts) | 0.5 | 0.5 | 0.8 | 0.5 | 0.5 | 0.5 |
| Surfactant added after polymerization (Parts) | | | | | | |
| Polyoxyethylene (40) stearate | | | | | 2 | 2 |
| Emulsion (A) | A-2 | A-3 | A-4 | A-5 | A-6 | A-6 |
| Emulsification | | | | | | |
| Trimethylsiloxy-end blocked silicone fluid (Parts) | | | | | | |
| Polydimethylsiloxane | | | | | | |
| Viscosity at 25° C.: | | | | | | |
| 200 cSt | 30 | | | | | |
| 500 cSt | | 30 | | | | |
| 1,000 cSt | | | 20 | | 20 | 20 |
| Polydiorganosiloxane | | | | | | |
| Diphenylsiloxy unit 8 mole % / Dimethylsiloxy unit 92 mole % / Viscosity at 25° C.: 500 cSt | | | | 20 | | |
| Surfactant (Parts) | | | | | | |
| Sorbitan monolaurate | 2 | | | 1 | 2 | 2 |
| Sorbitan tristearate | | 1.5 | | | | |
| Polyoxyethylene (20) sorbitan monooleate | | | 1 | | | |
| Polyoxyethylene (25) stearate | 2 | | | | 2 | 2 |
| Dihexadecyldimethylammonium chloride | | | | 2 | | |
| Water (Parts) | 66 | 66 | 77.5 | 77 | 76 | 76 |
| Emulsion (B) | B-2 | B-3 | B-4 | B-5 | B-6 | B-6 |
| Preparation of Emulsion Composition | | | | | | |
| (A)/(B) ratio (Parts/Parts) | 20/80 | 20/80 | 15/85 | 30/70 | 10/90 | 50/50 |
| Emulsion Composition | E-2 | E-3 | E-4 | E-5 | E-6A | E-6B |

The thus prepared emulsion compositions E-2 to E-6B were diluted with water to 10-fold for the cases of E-2 and E-3 and 5-fold for the other cases to prepare treating agent respectively. Glass beer bottles were coated with the treating agent respectively by brush-coating, and dried at the room temperature for 12 hours to form silicone films. For the other case emulsion composition E-1 prepared in Example 1 was diluted with water to 3-fold, and coated by spraying on the surfaces of glass beer bottles, and dried at 35° C. for 30 minutes under air blowing to obtain similar silicone films.

To compare the emulsion of film-forming polyorganosiloxane obtained by emulsion polymerization A-4 and the emulsion of polydimethylsiloxane B-3 were respectively diluted with water to 5-fold, coated on glass beer bottles by brush-coating respectively and dried at the room temperature for 12 hours to form silicone films.

The results of the evaluation for these silicone films are illustrated in Table 4.

TABLE 4

| Item | E-1 (Spray) | E-2 | E-3 | E-4 | E-5 | E-6A | E-6B | A-4 (Comparative Sample) | B-3 (Comparative Sample) |
|---|---|---|---|---|---|---|---|---|---|
| Conceal property for graze | ⊚ | ⊚ | ⊚ | ⊚ | ⊚ | ⊚ | ⊚ | ○ | ○ |
| Appearance | ⊚ | ⊚ | ⊚ | ⊚ | ⊚ | ⊚ | ⊚ | ○ | ⊚ |
| No smell | ⊚ | ⊚ | ⊚ | ⊚ | ⊚ | ⊚ | ⊚ | ○ | ⊚ |
| No unusual lubricity When dipped water | ⊚ | ⊚ | ⊚ | ⊚ | ⊚ | ⊚ | ⊚ | ⊚ | △ |
| No oil film formed on water | ⊚ | ⊚ | ⊚ | ⊚ | ⊚ | ⊚ | ⊚ | ⊚ | △ |
| No appearance change | ⊚ | ⊚ | ⊚ | ⊚ | ⊚ | ⊚ | ⊚ | ⊚ | ○ |
| Removable by alkaline water (The same condition as Example 1) | ⊚ | ⊚ | ⊚ | ⊚ | ⊚ | ⊚ | ○ | X | ⊚ |

Note
⊚: Excellent
○: Good
△: Slightly no good
X: No good

We claim:

1. An emulsion composition for concealing grazes on glass comprising an emulsion of from about 10 to about 50 parts by weight of composition (A) and from about 50 to about 90 parts by weight of composition (B), said composition (A) being obtained by emulsion-polymerizing:

(1) 0.1–60 weight percent based on composition (A) of the reaction product of:
  (a) 0.1–50 weight percent based on the total of (a) and (b) of the product obtained by reacting:
    (i) 1 mole of a compound of the formula

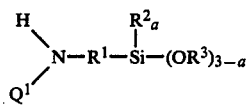

wherein $Q^1$ is a monovalent radical selected from the group consisting of hydrogen, $-CH_3$, $-CH_2CH_2NH_2$ and $-CH_2CH_2NHCH_2CH_2NH_2$; $R^1$ is a divalent hydrocarbon group having 3–4 carbon atoms; $R^2$ and $R^3$ are monovalent hydrocarbon radicals having 1–4 carbon atoms and a is an integer equal to 0 or 1; with (ii) 0.5–3.0 moles of a compound of the formula

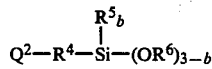

wherein $Q^2$ represents an epoxy group-containing group selected from the group consisting of glycidoxy and epoxycyclohexyl groups, $R^4$ is a divalent hydrocarbon radical having 2–4 carbon atoms, $R^5$ and $R^6$ are monovalent hydrocarbon radicals having 1–4 carbon atoms and b is an integer equal to 0 or 1; with (b) 50–99.9 weight percent based on the total of (a) and (b) of a polydiorganosiloxane having at least one terminal silanol group in the molecule and a viscosity at 25° C. of 5–10,000 cSt.

(2) 1–50 weight percent based on composition (A) of a cyclic compound of the formula

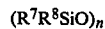

wherein $R^7$ and $R^8$ are the same or different substituted or unsubstituted hydrocarbon radicals having 1–50 carbon atoms and n is an integer equal to 3–6 inclusive;

(3) 0.1–20 weight percent based on composition (A) of a cationic surfactant or a surfactant mixture of cationic and nonionic surfactants;

(4) 20–90 weight percent based on composition (A) of water; and (5) an effective amount of an alkaline metal hydroxide having catalytic ability; and said composition (B) being obtained by emulsifying in water a polydiorganosiloxane having a viscosity at 25° C. of 10–100,000 cSt in the presence of a surfactant selected from the group consisting of nonionic surfactants, cationic surfactants and mixtures thereof.

2. The composition of claim 1 wherein the amount of polyorganosiloxane contained in composition (A) is 1–99 weight percent of the total amount of polysiloxane contained in composition (A) and composition (B).

3. The composition of claim 2 wherein the amount of polyorganosiloxane contained in composition (A) is 5–30 weight percent of the total amount of polysiloxane contained in composition (A) and composition (B).

4. The composition of claim 1 wherein $Q^1$ is a hydrogen atom.

5. The composition of claim 1 wherein $Q^1$ is $CH_2CH_2NH_2$.

6. The composition of claim 1 wherein ingredient (1)(b) is mono-silanol chainstopped or di-silanol chainstopped polydimethylsiloxane.

7. The composition of claim 1 wherein ingredient (1)(b) is alpha, omega-dihydroxy-polydiorganosiloxane.

8. The composition of claim 1 wherein the viscosity of ingredient (1)(b) is 200–1000 cSt at 25° C.

9. The composition of claim 1 wherein $R^7$ and $R^8$ are both methyl groups.

10. The composition of claim 1 wherein the amount of water based on composition (A) is from 40–80 weight percent.

11. The composition of claim 1 wherein the alkaline metal hydroxide is potassium hydroxide.

12. The composition of claim 11 wherein the amount of potassium hydroxide is 0.1–3 weight percent based on composition (A).

13. The composition of claim 1 wherein the polydiorganosiloxane of composition (B) is polydimethylsiloxane.

14. The composition of claim 1 wherein the viscosity of the polydiorganosiloxane of composition (B) is from 100–10,000 cSt at 25° C.

15. The composition of claim 1 wherein the polydiorganosiloxane of composition (B) is terminated by triorganosiloxane units.

16. The composition of claim 1 which is applied to a glass surface as a film having a thickness of from 0.5–10 microns.

17. The composition of claim 16 wherein the film is applied only on a grazed glass surface.

* * * * *